(12) United States Patent
Li et al.

(10) Patent No.: US 10,579,679 B2
(45) Date of Patent: Mar. 3, 2020

(54) DIRECTED GRAPH COMPRESSION

(71) Applicant: International Business Machines Corporation, Armonk, NY (US)

(72) Inventors: Guohua Li, Shanghai (CN); Qi Liang, Shanghai (CN); Qi Ye, Shanghai (CN); Tian Tian, Beijing (CN); Weixiong Rao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/828,878

(22) Filed: Dec. 1, 2017

(65) Prior Publication Data

US 2019/0012406 A1    Jan. 10, 2019

Related U.S. Application Data

(63) Continuation of application No. 15/642,612, filed on Jul. 6, 2017.

(51) Int. Cl.
*G06F 16/901* (2019.01)
*G06F 7/36* (2006.01)
*G06F 17/30* (2006.01)

(52) U.S. Cl.
CPC ............ *G06F 16/9024* (2019.01); *G06F 7/36* (2013.01); *G06F 17/30958* (2013.01)

(58) Field of Classification Search
CPC .................................................. G06F 16/9024
See application file for complete search history.

(56) References Cited

U.S. PATENT DOCUMENTS

| | | | |
|---|---|---|---|
| 8,645,339 B2 | 2/2014 | Kang et al. |
| 8,775,495 B2 | 7/2014 | Lumsdaine et al. |
| 9,529,935 B2 | 12/2016 | Davies |
| 9,535,963 B1 | 1/2017 | Shankar et al. |
| 2007/0179976 A1 | 8/2007 | Arvin et al. |
| 2007/0192762 A1 | 8/2007 | Eichenberger et al. |
| 2013/0063453 A1 | 3/2013 | Bloomfield et al. |
| 2014/0258689 A1 | 9/2014 | Song |
| 2014/0310302 A1 | 10/2014 | Wu et al. |
| 2017/0147287 A1 | 5/2017 | Acar et al. |

OTHER PUBLICATIONS

Johnson et al., "Compressing Large Boolean Matrices Using Reordering Techniques", Proceedings of the 30th VLDB, vol. 30, Conference, Toronto, Canada, Aug. 31-Sep. 3, 2004, p. 13-23.

Li et al., "Compression-Aware Graph Computation", UbiComp '16 Proceedings of the 2016 ACM International Joint Conference on Pervasive and Ubiquitous Computing: Adjunct, Heidelberg, Germany, Sep. 12-16, 2016, p. 1295-1302.

(Continued)

*Primary Examiner* — Amanda L Willis
(74) *Attorney, Agent, or Firm* — Edward J. Wixted, III

(57) ABSTRACT

In one embodiment of the present disclosure, an original graph including nodes is obtained. The nodes of the original graph are reordered to generate a reordered graph. Non-zero elements in an adjacency matrix for the reordered graph are clustered as compared with an adjacency matrix for the original graph. The adjacency matrix for the reordered graph is encoded with integers. The integers correspond to non-empty blocks in the adjacency matrix for the reordered graph.

10 Claims, 7 Drawing Sheets

(56) References Cited

OTHER PUBLICATIONS

Lim, et al., "SlashBurn: Graph Compression and Mining Beyond Caveman Communities", IEEE Transactions on Knowledge and Data Engineering, vol. 26, Issue: 12, Dec. 1, 2014, p. 3077-3089.
Shun et al., "Smaller and Faster: Parallel Processing of Compressed Graphs with Ligra+", Data Compression Conference (DCC), 2015, Snowbird, UT, USA, Apr. 7-9, 2015, p. 403-412.
"Adjacency matrix", From Wikipedia, the free encyclopedia, This page was last edited on May 24, 2017, 7 pages, <https://en.wikipedia.org/wiki/Adjacency_matrix>.
"Object storage", From Wikipedia, the free encyclopedia, This page was last edited on Jun. 20, 2017, 10 pages, <https://en.wikipedia.org/wiki/Object_storage>.
Li et al., "Directed Graph Compression", U.S. Appl. No. 15/642,612, filed Jul. 6, 2017, 28 pages.
IBM Appendix P, list of all patents and patent applications treated as related, filed herewith, 2 pages.
portal.nebih.gov, "Degree, In-Degree, Out-Degree, Weighted Degree, Weighted In-Degree, Weighted Out-Degree"; WebArchive Dated URL: <https://web.archive.org/web/20160913030332/https://portal.nebih.gov.hu/documents/10182/521653/Algorithms.pdf/6397efcc-6106-4f9e-8057-e7e63858e816>, (Year 2016), 4 pages.
Li et al., "Directed Graph Compression", U.S. Appl. No. 15/892,459, filed Feb. 9, 2018, 31 pages.
Mishra, Neeraj, "Representation of Graphs: Adjacency Matrix and Adjacency List", The Crazy Programmer, Mar. 10, 2014, 5 pages, <https://www.thecrazyprogrammer.com/2014/03/representation-of-graphs-adjacency-matrix-and-adjacency-list.html>.

| <NodeFrom, NodeTo> | Common Neighbo Count | Common |
|---|---|---|
| <0,6> | 1 | Node 4 in-degree |
| <1,4> | 1 | Node 3 in-degree |
| <3,4> | 1 | Node 5 in-degree |
| <4,5> | 1 | Node 7 in-degree |
| <0,3> | 1 | Node 1 out-degree |
| <0,4> | 1 | Node 6 out-degree |
| <2,4> | 1 | Node 0 out-degree |
| <3,5> | 1 | Node 4 out-degree |
| <3,7> | 1 | Node 4 out-degree |
| <5,7> | 1 | Node 4 out-degree |

|   | 0 | 1 | 2 | 3 | 4 | 5 | 6 | 7 |
|---|---|---|---|---|---|---|---|---|
| 0 | 0 | 1 | 1 | 0 | 0 | 0 | 0 | 0 |
| 1 | 0 | 0 | 1 | 1 | 0 | 0 | 0 | 0 |
| 2 | 0 | 0 | 0 | 0 | 1 | 0 | 0 | 0 |
| 3 | 0 | 0 | 0 | 0 | 0 | 0 | 0 | 1 |
| 4 | 1 | 0 | 0 | 0 | 0 | 0 | 1 | 0 |
| 5 | 1 | 0 | 0 | 1 | 0 | 0 | 0 | 0 |
| 6 | 1 | 0 | 0 | 0 | 0 | 1 | 0 | 0 |
| 7 | 0 | 1 | 0 | 0 | 0 | 0 | 0 | 0 |

DIRECTED GRAPH COMPRESSION

BACKGROUND

The present invention relates to data processing, and more specifically to directed graph compression.

Graphs are becoming increasingly important for numerous applications, ranging across the domains of World Wide Web, social networks, bioinformatics, computer security, and many others. Many graphs are directed, such as Web graph and Twitter social graph. In general, a directed graph is a graph that is a set of vertices connected by edges, and the edges have a direction associated with them.

SUMMARY

According to one embodiment of the present invention, there is provided a method for processing a graph. In this method, an original graph including a plurality of nodes is obtained. The nodes of the original graph are reordered to generate a reordered graph, wherein the non-zero elements in an adjacency matrix for the reordered graph are clustered as compared with an adjacency matrix for the original graph. The adjacency matrix for the reordered graph is encoded with a plurality of integers, wherein each of the plurality of integers represents corresponding non-empty block in the adjacency matrix for the reordered graph, and the non-empty blocks include at least one non-zero element.

According to one embodiment of the present invention, there is provided a system for processing a graph. The system comprises one or more processors, a memory coupled to at least one of the processors, and a set of computer program instructions stored in the memory and executed by at least one of the processors in order to perform a method. In this method, an original graph including a plurality of nodes is obtained. The nodes of the original graph are reordered to generate a reordered graph, wherein the non-zero elements in an adjacency matrix for the reordered graph are clustered as compared with an adjacency matrix for the original graph. The adjacency matrix for the reordered graph is encoded with a plurality of integers, wherein each of the plurality of integers represent corresponding non-empty block in the adjacency matrix for the reordered graph, and the non-empty blocks include at least one non-zero element.

According to another embodiment of the present invention, there is provided a computer program product for processing a graph. The computer program product comprises a computer readable storage medium having program instructions embodied therewith. The program instructions are readable by a device to cause the device to perform a method for processing a graph. In this method, an original graph including a plurality of nodes is obtained. The nodes of the original graph are reordered to generate a reordered graph, wherein the non-zero elements in an adjacency matrix for the reordered graph are clustered as compared with an adjacency matrix for the original graph. The adjacency matrix for the reordered graph is encoded with a plurality of integers, wherein each of the plurality of integers represent corresponding non-empty block in the adjacency matrix for the reordered graph, and the non-empty blocks include at least one non-zero element.

DETAILED DESCRIPTION

Embodiments of the present disclosure recognize that the growing scale of directed graphs has made efficient execution of graph computation very challenging. Embodiments of the present disclosure will be described in detail with reference to the accompanying drawings, in which the embodiments of the present disclosure have been illustrated. The present disclosure can be implemented in various manners and thus should not be construed to be limited to the embodiments disclosed herein.

Figure 1:
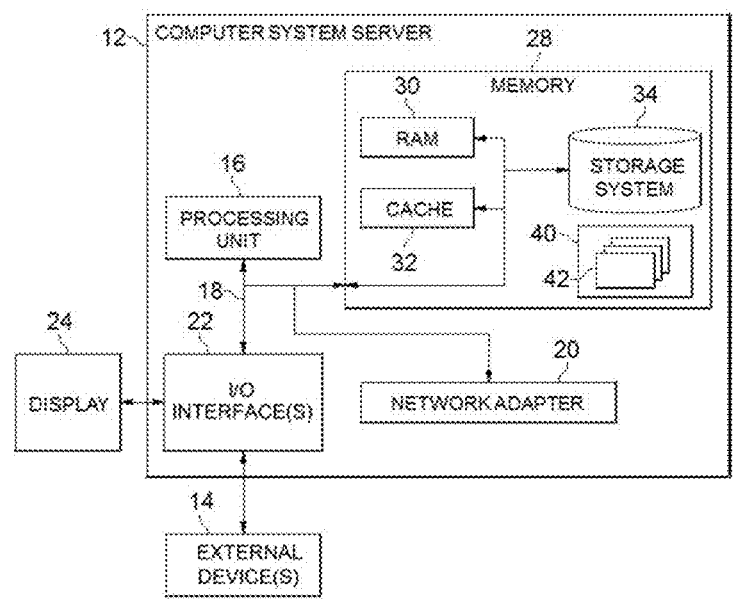
FIG. 1 shows an exemplary computer system which is applicable to implement the embodiments of the present disclosure.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 may include a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Reducing graph size to fit in memory, for example by using the technique of lossless compression, is crucial in cutting the cost of large scale graph computation. And current graph compression work still suffers from issues including low compression ratio and high decompression overhead.

In the present disclosure, a novel solution for compressing graphs are proposed here. In this solution, an effective clustering algorithm is first performed and then the resulting adjacency matrix is represented by lists of encoded numbers. In this way, this approach can greatly reduce the graph size.

Figure 2:
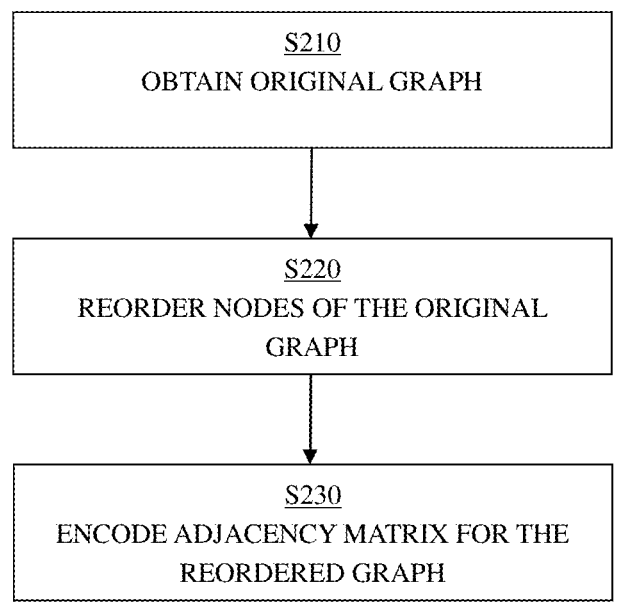
FIG. 2 is a flow chart showing a method for processing a graph according to one embodiment of the present disclosure.

With reference now to FIG. 2, a method according to one embodiment of the present disclosure will be described.

In Step S210, an original graph including a plurality of nodes may be obtained. A node ID may be assigned to each node in the graph to identify that node.

According to one embodiment of the present disclosure, an adjacency matrix M may be built for the graph in which the elements in the matrix indicate the adjacency relationship between two nodes. For example, the elements may indicate whether or not there exists an edge between two nodes.

According to one embodiment of the present disclosure, the graph may be a directed graph, and elements in the adjacency matrix may indicate whether or not a directed edge exists from one node to another node. For example, the matrix may be a binary matrix. And the binary element $e_{i,j}$ in the i-th row and j-th column may indicate whether or not there exists a directed edge from the i-th node to j-th node (where i and j denote node IDs). For example, 1-element indicates that there exists an edge while 0-element indicates no edge.

According to one embodiment, the value of an element in the matrix is not a binary value. For example, different values of elements may represent different weights of an edge. In this case, a non-zero element in the adjacency matrix would indicate a specific adjacency relationship between two nodes. Alternatively, the weights of the edges may be saved in a different matrix and the adjacency matrix is used to indicate the existence of an edge. In this case, each element of the matrix would have a binary value 0 or 1. In the following, the invention will be discussed with the value of an element being a binary value; however, it should be understood that this is for the purpose of simplified illustration and will not thereby limit the scope of the invention.

In Step S220, the nodes of the original graph may be reordered to generate a reordered graph. Non-zero elements in the adjacency matrix for the reordered graph may be clustered as compared with the adjacency matrix for the original graph. Having the non-zero elements in the matrix clustered reduces the graph space cost for storing a graph.

For example, when dividing the adjacency matrix M to a plurality of blocks of a×b elements, it may be determined whether or not a block is empty. In one embodiment, if all of the a×b elements in a block are zeros, then the block is empty, and if a block includes at least one non-zero element, then the block is a non-empty block. As a result, graph space cost can be measured by counting the non-empty blocks. With the reordering step, the non-zero elements are clustered, and the number of non-empty blocks are minimized, thereby reducing graph space cost.

In Step S230, the adjacency matrix for the reordered graph may be encoded with a plurality of integers. The integers may represent the non-empty blocks in the adjacency matrix for the reordered graph. As described above, a non-empty block includes at least one non-zero element. With the encoding step, the space required for storing the graph is further reduced.

Figure 3:
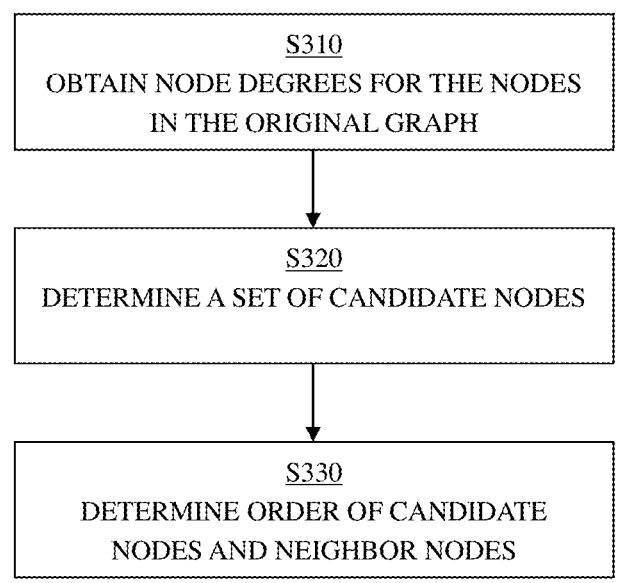
FIG. 3 is a flow chart showing the process of reordering graph nodes according to one embodiment of the present disclosure.

With reference now to FIG. 3, one embodiment of the process of reordering graph nodes (Step S220 in FIG. 2) will be described in further detail.

According to one embodiment of the present disclosure, to reduce graph space cost, the nodes of the original graph may be reordered, making the rows and columns in the corresponding adjacency matrix permuted, such that the non-zero elements in the permuted matrix are clustered.

First, an empty list P may be initialized. Empty list P may be used for saving the permutation of the new node ID (the node ID in P is the new node ID).

In Step S310, node degrees may be determined for the nodes in the original graph. According to one embodiment of the present disclosure, the node degree of a node indicates the number of neighbors of the node. The node degree may be in-degree or out-degree. The in-degree refers to the degree to which a node is pointed to by other nodes, that is, the number of other nodes pointing to the particular node. The out-degree refers to the degree to which a node points to other nodes, that is, the number of other nodes to which the particular node points.

Figure 4A:
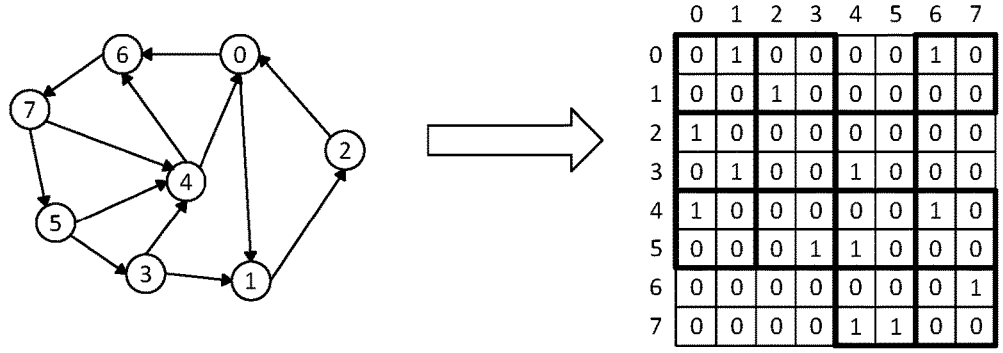
FIG. 4(a)-4(d) show an exemplary reordering of graph nodes according to one embodiment of the present disclosure.
Figure 4B:
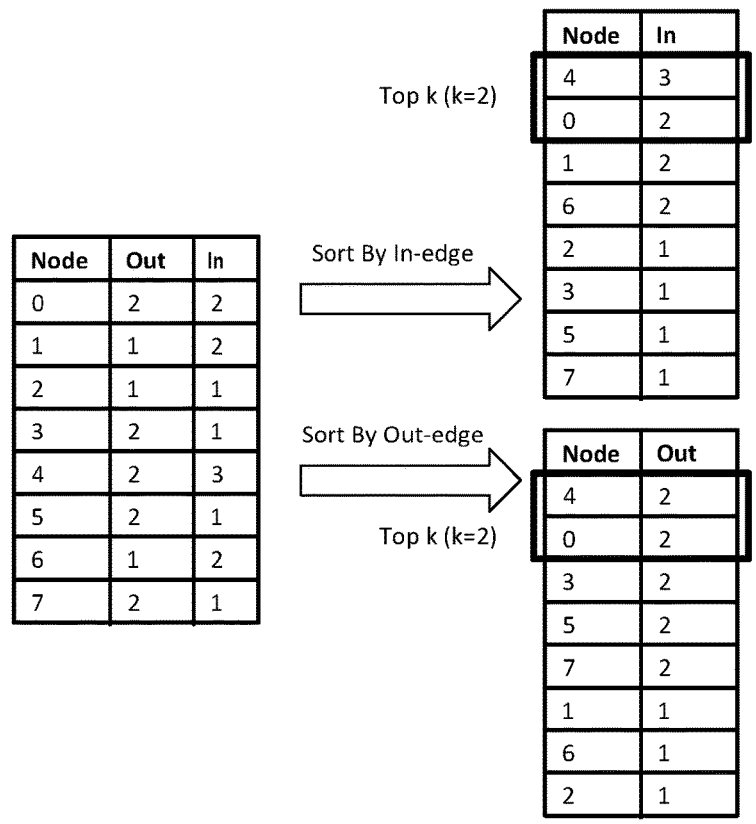

According to one embodiment of the present disclosure, the in-degree and out-degree of a node may be obtained according to the elements in the adjacency matrix. For example, FIG. 4(a)-4(d) show an example of reordering graph nodes according to one embodiment of the present disclosure. FIG. 4(a) shows the original graph and a corresponding adjacency matrix. FIG. 4(b) shows that the nodes are sorted in descending order according to the in-degree and out-degree of the nodes, and the top k number of nodes are determined according to in-degree and out-degree. As shown in FIG. 4(b), the in-degree of Node 0 is 2 since there are 2 1-elements in column ID 0, and the out-degree of Node 0 is 2 since there are 2 1-elements in row ID 0.

In Step S320, a set of candidate nodes in the original graph may be selected. According to one embodiment of the present disclosure, the set of candidate nodes may be the top k number of nodes selected according to their node degrees. The number k may be an integer parameter which is equal to or less than the total number of nodes in the graph.

After obtaining the in-degree and out-degree of the nodes in the graph, the nodes may be sorted in a descending order according to the in-degrees and/or out-degrees. Various sorting criteria may be applied. For example, the node with highest in-degree may be selected first. As another example, the node with highest out-degree may be selected first. Alternatively, the node with highest node degree which includes both in-degree and out-degree would be selected first. In the following, the invention will be discussed with the nodes sorted in a descending order according to in-degree and out-degree; however, it should be understood that this is only for the purpose of simplified illustration and will not thereby limit the scope of the invention.

According to one embodiment of the present disclosure, after the nodes are sorted in descending order according to in-degree and out-degree, the k highest in-degree and out-degree nodes may be selected, as in-degree candidate set L1 and out-degree candidate set L2 respectively. According to one embodiment of the present disclosure, if the top k nodes of L1 and L2 are same, the k candidate nodes may be obtained accordingly. According to one embodiment of the present disclosure, if the top k nodes of L1 and L2 are different, then the common nodes may be selected first. The rest of the nodes may be selected from L1 or L2, or from both of them, according to the in-degree and out-degree, and added to the list P.

As an example, in FIG. 4(b), k=2 and Nodes 4 and 0 are both top 2 in-degree nodes and top 2 out-degree nodes. Therefore, Nodes 4 and 0 are selected as candidate nodes.

In Step S330, the order of the candidate nodes and their neighbor nodes may be determined based on common neighbor information of the nodes. The common neighbor information of the nodes may refer to the number of common neighbor nodes of two nodes. The number may be the number of common in-neighbor nodes or the number of common out-neighbor nodes of the two nodes. For example, FIG. 4(c) shows an example of common neighbor information of nodes in the original graph.

Figure 4C:
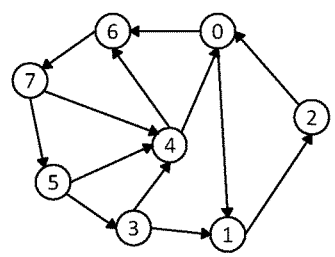

As shown in FIG. 4(c), Nodes 0 and 6 have a common in-neighbor, Node 4. Nodes 0 and 3 have a common out-neighbor, Node 1. The number of common neighbors may also be the total number of both common in-neighbors and out-neighbors or any other proper information.

According to one embodiment of the present disclosure, the common neighbor information of nodes may be determined from the graph or the corresponding adjacency matrix. The nodes with more common neighbors with other nodes would be put in front of those with less common neighbors.

According to one embodiment of the present disclosure, all of the k candidate nodes and the in-neighbors and out-neighbors of the k candidate nodes are added into a node set N. The node with the highest number of common neighbors may be determined and added into list P. The process of determining the node with highest number of common neighbors may be repeated until all of the nodes in node set N have been processed and added into the list P.

According to one embodiment of the present disclosure, if the parameter k equals the total number of nodes in the graph, then all of the nodes will be chosen in Step S320 and processed in Step S330. If the parameter k is smaller than the total number of nodes in the graph, then after the order of the k candidate nodes and their neighbor nodes has been adjusted based on common neighbor information of the nodes k candidates in Step S330, the process may go back to S320 for the rest of the nodes in the graph. Steps S320 and S330 may then be repeated until all the nodes in the graph have been processed.

Figure 4D:
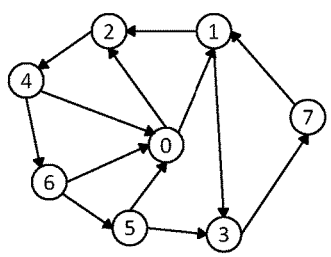

FIG. 4(d) shows a reordered graph as well as its adjacency matrix. For the adjacency matrices of the original graph and the reordered graph, if the graphs are divided into 2×2 elements, there are nine non-empty blocks in FIG. 4(d). Since the nine non-empty blocks are fewer than the eleven non-empty blocks in FIG. 4(a), this means that the non-zero elements in the matrix has been clustered.

In FIG. 4(a)-(d), a simple graph is used as an example to illustrate the clustering process. The clustering method according to the embodiments of the present disclosure would be useful particularly for the real world directed graphs. The real world directed graphs typically exhibit power law degree distribution. For example, for the hub nodes with high in-degrees in real world directed graphs, due to the power law in-degree distribution in such graphs, few hub nodes are with a large amount of in-coming edges, indicating very high in-degree. And the majority of nodes have low in-degrees. Therefore, for two hub nodes pointed by a large amount of spoke neighbors, it is not rare that such hub nodes share many common spoke neighbors. If the similarity of such spokes is high, we would like to permute the hub nodes together in the matrix columns Meanwhile, if two spoke neighbors share common hubs, the similarity of such spokes is high and they may also put together in the matrix rows.

Further, real world directed graphs also follow power-law out-degree distribution, i.e., few hub nodes are with a very large amount of out-going edges (very high out-degrees), and the majority of nodes are with low out-degrees. Therefore, for two hub nodes with high out-degrees, if they share many spoke neighbors, the hub vertices may be placed together in the matrix rows. Meanwhile, if two spoke nodes share many incoming hub neighbors, the spoke nodes would be placed together in the matrix columns.

Figure 5:
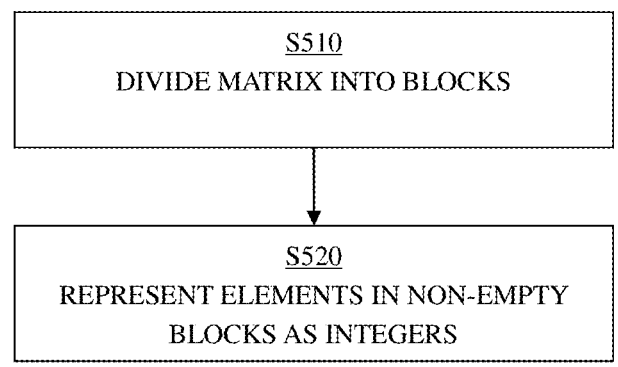
FIG. 5 is a flow chart showing the process of encoding an adjacency matrix according to one embodiment of the present disclosure.

With reference now to FIG. 5, the process of encoding the adjacency matrix according to one embodiment of the present disclosure (Step S230 in FIG. 2) will be described in detail.

In Step S510, the adjacency matrix for the reordered graph may be divided into a plurality of blocks. At least one block may have more than one binary elements.

According to one embodiment of the present disclosure, the matrix may be divided into a plurality of blocks with same size, such as blocks with b×b elements or blocks with a×b elements. According to another embodiment of the present disclosure, the blocks may have difference size. For example, some blocks may have a×b elements, some blocks may have c×d elements, etc.

As described, if all elements in a block are zeros, then the block is an empty block. If the block includes at least one non-zero element, then the block is a non-empty block. The graph space cost may be measured by counting the non-empty blocks. According to one embodiment of the present disclosure, the nearby non-zero elements may be grouped into blocks so as to have fewer blocks, which will further reduce graph space cost.

In Step S520, the binary elements in the non-empty block may be represented as at least one integer, and the binary elements in the non-empty block may be treated as the binary form of the at least one integer.

With the step S520, the non-empty blocks in the matrix may be represented as a plurality of integers and the plurality of integers may be maintained instead of the elements in the blocks.

Figure 6A:
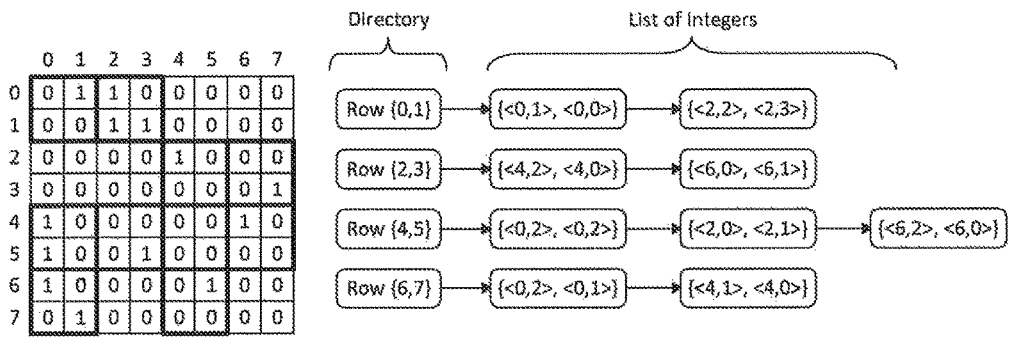
FIG. 6(a)-6(c) show an exemplary encoding of the adjacency matrix according to one embodiment of the present disclosure.

In the following, embodiments of the present disclosure will be detailed described with reference to FIG. 6(a)-6(c) which show encoding examples according to the embodiments of the present disclosure. The examples described are for the purpose of simplified illustration and the scope of the invention is not thus limited. In FIG. 6(a), the matrix is divided into blocks consisting of 2×2 elements. The block consisting of 2×2 elements is used as an example and the block may comprise any number of elements as appropriate.

A directory may be utilized to maintain matrix row IDs. The directory may contain the associated matrix row IDs where the non-empty blocks are located in the matrix. For example, in FIG. 6(a), since the matrix is divided into 2×2 blocks, the directory contains two row IDs when the each of such IDs is with at least one non-empty block. Among the 8 row IDs (from 0 to 7), there are four total set of numbers in the directory: {0, 1}, {2, 3}, {4, 5}, and {6, 7}.

Next, according to one embodiment of the present disclosure, to encode a non-empty block, we may use two set of numbers. The first number in the first set is left-most column ID (startColumn) of the first row in this block. The first number in the second set is the leftmost column ID (startColumn) of the second row in this block. Next, by treating the binary elements inside the rows of the block as the binary form of an integer, we can use the integer number to represent each row in the block. The two set of numbers would be {<startColumn, firstRowCoding>, <startColumn, secondRowCoding>.

For example, for the left non-empty block in the row IDs 0 and 1 in FIG. 6(a), the leftmost column ID is 0. The binary element in the row 0 is 01, which are encoded to be an integer 1. The binary element in the row 1 is 00, which are encoded to be an integer 0. Thus, a set of integer pairs {<0, 1>, <0, 0>} is used to encode the block. Similarly, the second block in row IDs 0 and 1 is represented as {<2, 2>, <2, 3>}.

Similar situation holds for other non-empty blocks. The right part in FIG. 6(a) gives the directory and lists of integer pairs to encode the graph in FIG. 6(a).

Figure 6B:
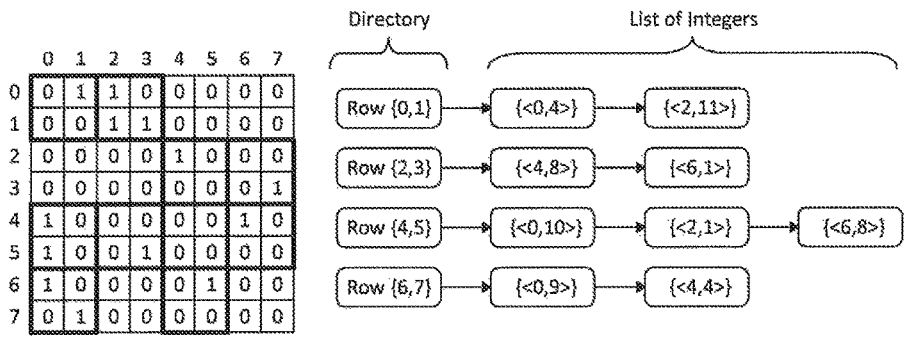

According to another embodiment of the present disclosure, the binary elements inside the whole block may be treated as the binary form of an integer, as shown in FIG. 6(b). For each non-empty block, one set of numbers will be used. The first number in the set would be leftmost column ID (startColumn) of the first row in this block. The second number in the set would be an integer by treating the binary elements inside the whole block as the binary form of the integer. The set of numbers would be {startColumn, wholeBlockCoding}.

Use the matrix in FIG. 6(b) as an example. The first number is the left-most column ID of the block. For the left non-empty block in the row IDs 0 and 1, the leftmost column ID is 0; the 2×2=4 binary elements 0100 are encoded to be an integer 4. Thus, we use an integer pair {0, 4} to encode the block. A similar situation holds for other non-empty blocks. In the second block in row IDs 0 and 1, the binary element is 1011, which would be the integer 11. Therefore, the second block in row IDs 0 and 1 is represented as {2, 11}.

Figure 6C:
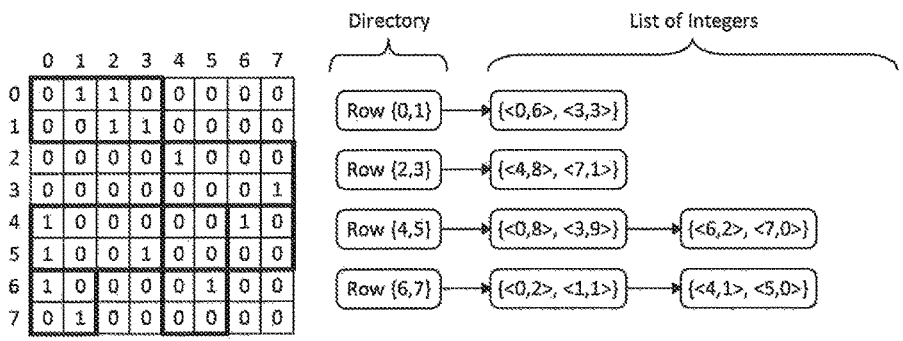

FIG. 6(c) show another encoding example according to the embodiments of the present disclosure. In FIG. 6(c), the matrix is divided into blocks consisting of a plurality of elements. The nearby non-zero elements are grouped into blocks so as to have fewer blocks. For example, in FIG. 6(c), six blocks are obtained from the matrix, in which three blocks include eight elements and three blocks include four elements.

Similarly, a directory is used to maintain the matrix row IDs. Among the 8 row IDs (from 0 to 7), there are four total elements in the directory: {0, 1}, {2, 3}, {4, 5}, and {6, 7}.

Next, to encode a non-empty block, two sets of numbers are used. According to one embodiment of the present disclosure, the first number in the first set is leftmost column ID (startColumn) of the first row in this block. The first number in the second set is the right-most column ID (endColumn) of the first row in this block. Next, by treating the binary elements inside the rows of the block as the binary form of an integer, the integer number can be used to represent each row in the block. The two sets of numbers would be {<startColumn, firstRowCoding>} and {<endColumn, secondRowCoding>}.

For example, for the left non-empty block in the row IDs 0 and 1, its leftmost column ID is 0 and its rightmost column ID is 3. The binary elements in the row 0 is 0110, which are encoded to be an integer 6. The binary elements in the row 1 is 0011, which are encoded to be the integer 3. Thus, we use a set of integer pairs {<0, 6>, <3, 3>} is used to encode the block. Similarly, the second block in row IDs 2 and 3 is represented as {<4, 8>, <7, 1>}.

The integer pairs shown in FIG. 6(a)-6(c) are for the purpose of simplified illustration. Other formats could also be used to represent non-empty blocks, for example, in the format of {<startColumn, {firstRowCoding, secondRowCoding, . . . ,} etc. Further, the embodiments are described by using binary matrix with binary elements. However, the elements in the matrix may also be represented by any other appropriate radix, such as octal, hexadecimal, and the like.

With the encoding methods, according to various embodiments of the present disclosure, the decoding overhead from the encoded number to original binary elements would be trivial.

According to one embodiment of the present invention, there is provided a system for processing a graph. The system comprises one or more processors, a memory coupled to at least one of the processors, and a set of computer program instructions stored in the memory and executed by at least one of the processors in order to perform a method. In this method, an original graph including a plurality of nodes is obtained. The nodes of the original graph are reordered to generate a reordered graph, wherein the non-zero elements in an adjacency matrix for the reordered graph are clustered as compared with an adjacency matrix for the original graph. The adjacency matrix for the reordered graph is encoded with a plurality of integers, wherein each of the plurality of integers represents a corresponding non-empty block in the adjacency matrix for the reordered graph, and the non-empty blocks include at least one non-zero element.

According to another embodiment of the present invention, there is provided a computer program product for processing a graph. The computer program product comprises a computer readable storage medium having program instructions embodied therewith. The program instructions are readable by a device to cause the device to perform a method for processing a graph. In this method, an original graph including a plurality of nodes is obtained. The nodes of the original graph are reordered to generate a reordered graph, wherein the non-zero elements in an adjacency matrix for the reordered graph are clustered as compared with an adjacency matrix for the original graph. The adjacency matrix for the reordered graph is encoded with a plurality of integers, wherein each of the plurality of integers represents corresponding non-empty blocks in the adjacency matrix for the reordered graph, and the non-empty blocks include at least one non-zero element.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    reordering, by one or more processing units, a plurality of nodes of a graph to generate a reordered graph, wherein a plurality of non-zero elements in a reordered adjacency matrix are clustered, reducing a number of non-empty blocks, as compared with an adjacency matrix; and
    encoding, by the one or more processing units, the reordered adjacency matrix with a plurality of integers, wherein the encoding comprises:
        creating, by the one or more processing units, (i) a directory to maintain adjacency matrix identifications, (ii) a first set of integers, and (iii) a second set of integers, wherein:
            a first non-empty block includes at least two rows;
            the directory includes an associated row identification that identifies row location of the first non-empty block in the adjacency matrix;
            the first set of numbers comprises: (i) a first integer that is a left-most column identification of the first non-empty block and (ii) a second integer that is a representation of a first binary number present in the first row of the first non-empty block;
            the second set of numbers comprises: (i) a third integer that is a right-most column identification of the first non-empty block and (ii) a fourth integer that is a representation of a second binary number present in the second row of the first non-empty block.

2. The method according to claim 1, wherein the graph is a directed graph, and each element of a plurality of elements in the adjacency matrix indicates whether a directed edge exists from a first node to a second node of the plurality of nodes.

3. The method according to claim 1, wherein the encoding comprises:
    dividing, by the one or more processing units, the reordered adjacency matrix into a plurality of blocks, wherein each block includes at least one element of a plurality of elements in the reordered adjacency matrix; and
    representing, by the one or more processing units, each non-empty block of the plurality of blocks as at least one integer of the plurality of integers, wherein elements in each non-empty block are treated as a binary form of the at least one integer.

4. The method according to claim 1, wherein the reordering comprises:
    obtaining, by the one or more processing units, node degrees for each node of the plurality of nodes in the graph;
    determining, by the one or more processing units, a set of candidate nodes from the plurality of nodes in the graph based on the node degrees; and
    determining, by the one or more processing units, an order of the set of candidate nodes and corresponding neighbor nodes based on common neighbor information.

5. The method according to claim 4, wherein the node degrees include an in-degree and an out-degree, wherein the in-degree indicates a degree to which a node is pointed to by the plurality of nodes and the out-degree indicates a degree to which the node points to the plurality of nodes.

6. The method according to claim 4, wherein the determining the set of candidate nodes comprises:
    sorting, by the one or more processing units, the plurality of nodes in the graph according to the node degrees, wherein the node with a highest node degree, which includes both in-degree and out-degree, is selected first, based on comparing a highest in-degree and a highest out-degree; and
    determining, by the one or more processing units, k number of nodes as the set of candidate nodes, wherein k is an integer less than or equal to a total number of nodes in the graph.

7. The method according to claim 4, wherein the common neighbor information is a number of neighbor nodes shared in common between two nodes of the set of candidate nodes, and wherein the order of the set of candidate nodes is a descending order according to the number of neighbor nodes shared in common for each candidate node.

8. The method according to claim 4, wherein the determining the set of candidate nodes comprises:
    sorting, by one or more processing units, the plurality of nodes in the graph according to the node degrees, wherein the node with a highest in-degree is selected first; and
    determining, by the one or more processing units, k number of nodes as the set of candidate nodes, wherein k is an integer less than or equal to a total number of nodes in the graph.

9. The method according to claim 4, wherein the determining the set of candidate nodes comprises:
    sorting, by one or more processing units, the plurality of nodes in the graph according to the node degrees, wherein the node with a highest out-degree is selected first; and
    determining, by the one or more processing units, k number of nodes as the set of candidate nodes, wherein k is an integer less than or equal to a total number of nodes in the graph.

10. The method according to claim 1, wherein the first non-empty block is of a different size than a second non-empty block of the number of non-empty blocks.

* * * * *